United States Patent [19]

Pinckney

[11] Patent Number: 5,070,044
[45] Date of Patent: Dec. 3, 1991

[54] BRIGHTLY COLORED CANASITE GLASS-CERAMICS

[75] Inventor: Linda R. Pinckney, Corning, N.Y.

[73] Assignee: Corning Incorporated, Corning, N.Y.

[21] Appl. No.: 646,430

[22] Filed: Jan. 28, 1991

[51] Int. Cl.⁵ .............................................. C03C 10/16
[52] U.S. Cl. ....................................................... 501/3
[58] Field of Search ............................................. 501/3

[56] References Cited

U.S. PATENT DOCUMENTS 4,386,162  5/1983  Beall ........................................ 501/3

*Primary Examiner*—Mark L. Bell
*Attorney, Agent, or Firm*—Timothy M. Schaeberle; Clinton S. Janes, Jr.

[57] ABSTRACT

The instant invention is directed to the production of opaque glass-ceramic articles containing canasite crystals as the predominate crystal phase exhibiting strong bright colors. The desired color is obtained through the addition of a colorant system to the precursor glass composition utilized for the production the canasite glass-ceramic.

Opaque glass ceramic articles exhibiting bright colors ranging from purple-to-blue-to-green are obtained through the addition of a colorant system consisting essentially, expressed in weight percent, of about 0.02%–1.5% total of at least one member selected from the group consisting of $Cr_2O_3$ and $Co_3O_4$, with the maximum amount of either member being about 1.0%.

Another embodiment is directed towards the production of opaque glass-ceramic articles exhibiting strong bright colors yellow-to-orange-to-red-to-brown colors. The desired color is obtained through the addition, under mildly reducing conditions, of a colorant system consisting essentially, expressed in weight percent, of about 0.1%–1.0% of at least one member selected from the group consisting of CdS, Se and CdO, with the maximum presence of each member being about 1.5%.

A final embodiment is directed towards the production of opaque glass-ceramic articles exhibiting a strong bright black coloration. The desired color is obtained through the addition, under reducing conditions of a colorant system consisting essentially of about 0.01%–1.0% of NiO.

7 Claims, No Drawings

BRIGHTLY COLORED CANASITE GLASS-CERAMICS

This invention relates to colored, opaque, crystallized glass-ceramics, and more specifically to bright and vividly colored canasite glass-ceramics.

BACKGROUND OF THE INVENTION

Glass-ceramic articles, i.e., precursor glass bodies which have been subjected to a controlled heat treatment in order to effect crystallization, are well known in the art. Glass- ceramics which have as a dominant crystal phase, that of canasite, were disclosed in U.S. Pat. No. 4,386,162 (Beall). That canasite patent disclosed translucent-to-opaque glass-ceramic articles with a composition consisting essentially, in weight percent on the oxide basis, of about 45–75% $SiO_2$, 8–30% CaO, 2.5–12% F, 3–15% $Na_2O$, 0–20% $K_2O$, 5–25% $Na_2O+K_2O$, 0–6% $B_2O_3$, 0–7% A and 0–12% $ZrO_2$. The most preferred composition was stated to have an analyzed composition of about 50–65% $SiO_2$, 0–3% $B_2O_3$, 0–3% $Al_2O_3$, 15–24% CaO, 3–13% $Na_2O$, 3–15% $K_2O$, 11–22% $Na_2O+K_2O$, and 0–8% $ZrO_2$.

Generally, in the absence of added colorants, opaque glass-ceramic articles, such as the above canasite, display a white appearance. Corning Code 9608 glass-ceramic, marketed by Corning Incorporated, Corning, N.Y. under the trademark CORNING WARE® is another example of a glass-ceramic which appears opaque and creamy-white in its uncolored state.

The soft translucence of the basic white, opaque canasite glass-ceramic, perceived by architects and designers as a having marble-like "depth", serves as a key advantage of this material over many other architectural materials. However, for any architectural application, having a wide range of available strong bright colors in addition to white would be highly desirable. Masking canasite's translucence with an opaque colored glaze, as is done with most commercial floor tiles, would nullify the uniqueness of this material. Placing the color in the body, however, and glazing if desired with a clear transparent glaze, preserves much of the illusion of "depth", while satisfying the need for a range of bright colors. Additionaly, another advantage of this approach is that a clear glaze on a colored body, such as a tile, provides uniformity of color despite variations in glaze thickness and despite any scratches or chips in the tile.

It is thus highly desirable to produce bright and vividly colored opaque glass-ceramics, and therefore it is one of the main objectives of this disclosure to disclose glass ceramics possessing this characteristic.

The coloration of glass-ceramics is well known in the art and thus the subject of numerous patents. Typical colorants, known in the glass art, have been incorporated into a base precursor glass compositions, and then crystallized in situ to form colored glass-ceramic articles. However, the range and brightness of the colors capable of being produced in opaque glass-ceramics is limited. For example, U.S. Pat. No. 4,192,688 (Babcock et al.) discloses colored opaque and/or transparent, low expansion, crystallized glass-ceramics formed from different colored crystallizable base glasses and having lithium-containing crystals as the predominant crystalline species. The base glass compositions consisted of at least the following essential components in the following weight percentage limits, based on the total glass composition:

$SiO_2$ 50–75
$Al_2O_3$ 16–35
$Li_2O$ 3–5.5
Colorants 0.005–2
Nucleating Agent Variable
 $Li_2O$+Nucleating Agent At least 5.5

The colors obtained in the opaque glass-ceramics described in this reference are limited to the typical softer pastel and pale earth tones, e.g., light blues, greens, grays and yellows. Therefore, to produce a transparent glass-ceramic in which somewhat brighter colors can be obtained, this reference teaches the strict and careful control of the crystallization through the use of a nucleating agent.

SUMMARY OF THE INVENTION

Opaque glass-ceramic articles containing canasite as the predominate crystal phase exhibiting strong bright colors ranging from purple-to-blue-to-green can be prepared from precursor glasses having base compositions consisting essentially, expressed in the terms of weight percent on the oxide basis, of about 45–75% $SiO_2$, 8–30% CaO, 3.5–12% F, 3–15% $Na_2O$, 0–20% $K_2O$, 5–25% $Na_2O+K_2O$, 0–6% $B_2O_3$, 0–7% $Al_2O_3$ and 0–12% $ZrO_2$. The desired color is obtained through the addition of about 0.02–1.5% total of at least one member selected from the group consisting of $Cr_2O_3$ and $Co_3O_4$, the maximum amount of either member being about 1.0%, and an optional amount of about 0.01–1.5%, collectively or individually of at least one member selected from the group consisting of NiO and $V_2O_5$.

Subtle changes in the shades or tint of the color may be obtained with a change in the redox conditions. Specifically, reduction during glass melting produces glass-ceramics which generally possess less brilliant blue-green-purple colors than those canasite glass-ceramics produced under oxidizing conditions. This change in conditions may be accomplished through changing the batch materials from impurity-free materials to materials containing impurities susceptible to reduction, notably S. Alternatively, the redox conditions may be changed by the addition of either a reducing or oxidizing agent. The effect of redox condition change is more pronounced in the chrome (green) colors than in the cobalt (blue) colors.

Using the same basic precursor glass composition with the addition of about 0.1–1.0% of the colorant NiO and an optional amount of about 0.001–0.05% of $Cr_2O_3$, produces a similar opaque glass-ceramic article as above; however, with exhibiting a strong bright black coloration.

Again, the redox conditions during melting, which may be controlled by the level of impurity of the batch materials, controls the colors achievable. Oxidizing conditions, accomplished through either the addition of an oxidizing agent or by maintaining an impurity-free batch results in medium to light gray glass-ceramics. On the other hand, proper reducing conditions, i.e., batch material impurities or the addition of a reducing agent, combined with the proper percentage of the NiO colorant, produces canasite glass-ceramics which possess a black or charcoal color.

A similar opaque glass-ceramic article as described above exhibiting bright colors ranging from yellow-to-orange-to-red-to-brown can be prepared from the above described precursor glass compositions. The desired color is obtained through the addition, under mildly reducing conditions, of about 0.1–2.5% of at least one member selected from the group consisting of CdS, Se, and CdO, the maximum presence of each member being about 2.0%. $Fe_2O_3$ may be also be added to obtain slight variations in the color.

The wide range of colors in these glass-ceramics, as compared to the Co-Cr-Ni systems, is due to the complex formation of colloidal sulfoselenide crystals, i.e., mixed crystals of CdS and CdSe, which precipitate out as the hot glass cools. The proportion and oxidation states of these crystals determine the color in the glass and glass-ceramic.

All three components of the colloid material are very volatile at glass melting temperatures and therefore the Cd-S-Se glasses must be melted under carefully controlled conditions to prevent burning out of the sulfoselenide crystals due to oxidation. Canasite glass-ceramics are well suited for this delicate colorant system because: (1) Fining agents, which produce oxidizing conditions, are not needed; and, (2) Canasite glasses have a low melting point temperature. Assuming the absence of impurities that might bind with the Cd-S-Se atoms, only very mildly reducing conditions are required to produce bright colors, i.e. no reducing agents, as such, are needed. However, the addition of a reducing agent will result in darker colors. The effects of impurities and the changes in redox conditions are more pronounced in this colorant system than in the Co-Cr-Ni system, because of the delicate balance of the Cd-S-Se proportions and oxidation states.

PRIOR ART

U.S. Pat. No. 4,007,048 (Sack et al.) provides for a dark red transparent glass-ceramic which has as its crystal phase a concentration of $\beta$-quartz solid solution and/or $\beta$-spodumene of at most 50% by weight. The glass-ceramic is formed from a basic glass having the following composition calculated in percentages by weight of the following oxides: 64% $SiO_2$, 21.3% $Al_2O_3$, 3.5% $Li_2O$, 0.6% $Na_2O$, 0.5% $K_2O$, 2.5% BaO, 0.2% CaO, 0.1% MgO, 1.5% ZnO, 2.3% $TiO_2$, 1.6% $ZrO_2$, 0.65% $MnO_2$, 0.23% $Fe_2O_3$, 0.37% CoO, 0.06% NiO and 0.85% $Sb_2O_3$. This base glass is heat treated at a temperature range of from 800°–900° C. to form the glass-ceramic. However, there is no description of opaque glass-ceramic articles which possess strong and a bright coloration in accord with the present invention.

Other patents such as U.S. Pat. Nos. 4,009,042 (Rittler) and 4,018,612 (Chyung) mention the utility of transition metal oxides as colorants for transparent glass-ceramics, but without specifying the colors obtained or the method to achieve those colors. Again, there is no mention in either of strong and bright colored glass-ceramics.

U.S. Pat. No. 4,084,974 (Beall) describes a method of making light-absorbing, $TiO_2$ glass-ceramic articles. These light-absorbing glass-ceramic articles are comprised of a $\beta$-spodumene and/or a $\beta$-quartz principal crystal phase. The glass-ceramics' blue-to-black coloration is provided by adding a glass reducing agent to a titanium-containing lithium aluminosilicate glass batch for the parent glass. The present invention possesses a completely different crystal phase and does not require, to produce coloration, the addition of either the $TiO_2$ nucleating agent or the reducing agent required to reduce the added $Ti^{+4}$.

U.S. Pat. No. 4,211,820 (Cantaloupe et al.) teaches how to confer a red-brown coloration to transparent glass-ceramics which is sufficiently pronounced to reduce to about 20–60% the light transmission factor. The products have a base composition in the general $Li_2O$-$Al_2O_3$-$SiO_2$ field nucleated with $TiO_2$. The desired coloration is developed by the inclusion of $V_2O_5$ in the starting batch. However, this invention does not include any description of opaque glass-ceramics exhibiting bright and vivid coloration as is disclosed in the present invention.

U.S. Pat. No. 4,461,839 (Rittler) is directed to the production of colored, transparent, translucent and opaque glass-ceramic articles containing $\beta$-quartz or $\beta$-spodumene solid solution as the predominant crystal phase. These colored glass-ceramic articles were formed from precursor glass articles having a base glass composition essentially free from MgO and consisting essentially, in weight percent, of: 63.5–69% $SiO_2$, 15–25% $Al_2O_3$, 2.5–4% $Li_2O$, 0–5% 0.1–0.6% $Na_2O$, 0.1–0.6% $K_2O$, 0–2% ZnO, 0–5% BaO, 2–3% $TiO_2$, 0.5–2.5% $ZrO_2$, 0.4–0.8% $As_2O_3$ and 0.05–0.1% $Fe_2O_3$. The desired colors, black-to-brown-to-red and gray-to-almond-to-beige-to-yellow, are obtained through the use of a "color package" containing about 0.5–3% $TiO_2$ and up to 0.15% $Fe_2O_3$, with 0.3–3% total of at least two oxides in the indicated proportion selected from the group of up to 0.3% $V_2O_5$, up to 3% $CeO_2$, up to 2% CaO, up to 1% $WO_3$, and up to 1.5% $SnO_2$. The total $TiO_2$ content will range >2.5%–6% and that of the $Fe_2O_3$ content will range 0.05–0.2%. This reference makes mention of the necessary reaction between $TiO_2$ and $Fe_2O_3$ with at least two members of the group CaO, $CeO_2$, NiO, $SnO_2$, $V_2O_5$ and $WO_3$, a reaction not required in the instant invention. Furthermore, the reference requires the addition of $As_2O_3$ to augment the intensity of the colors developed, whereas brightly colored articles can be obtained in the instant invention without required color intensifiers.

U.S. Pat. No. 4,526,872 (Andrieu et al.) teaches transparent glass-ceramic articles of light brown color as well as the method of making the same. These colored articles are given their light brown tint through the inclusion of 0.0025–0.02% CoO+$Cr_2O_3$, consisting of 0.001–0.01% CoO and 0.001–0.01% $Cr_2O_3$, in the base glass composition of the glass-ceramic. U.S. Pat. No. 4,786,617 (Andrieu et al.) describes the fabrication of opaque glass-ceramic articles containing potassium fluorrichterite and/or fluormica as the predominant crystal phase(s) from precursor glass compositions essentially free from $Li_3O$ and which consist essentially, in weight percent, of about 62–70% $SiO_2$, 2.75–7% $Al_2O_3$, 11–16% MgO, 4.75–9% CaO, 0.5–3% $Na_2O$, 2.5–5.5% $K_2O$, <6.8% $Na_2O$+$K_2O$, 2–3.25% F, 0–3.5% BaO, and 0–2.5% $P_2O_5$. This patent also teaches the use of such conventional glass colorants such as, $Fe_2O_3$, $CeO_2$, CaO, $Cr_2O_3$, CuO, $MnO_2$, $Na_2O$ and $V_2O_5$, with only $Fe_2O_3$ being expressly mentioned as a colorant to impart a yellow tint to the glass-ceramic. These colorants are to be added to the base precursor glass composition in amounts typically less than 1% or the total. However, neither of these patents is directed toward disclosing a glass-ceramic exhibiting strong and bright colors, the subject matter of the present invention.

U.S. Pat. No. 4,977,110 (Amundson et al.) describes a beige-tinted glass-ceramic article containing $\beta$-spodumene solid solution as the predominant crystal phase.

The composition of this glass-ceramic consists essentially, expressed in terms of weight percent on the oxide basis, of 66-70% $SiO_2$, 16.5-19.5% $Al_2O_3$, 2-4 $Li_2O$, 1-5% MgO, 0.5-2% ZnO, 0-1% $Na_2O$, 3.5-5.5% $TiO_2$, 1.5-2.75% $CeO_2$, 0-1.5% $As_2O_3$, 0-1.2% F and 0-2.5% $ZrO_2$. Again, there is no mention or teaching of brightly colored glass-ceramics.

DESCRIPTION OF THE PREFERRED EMBODIMENT

Tables I-V below list several precursor glass compositions, expressed in terms of parts by weight on the oxide basis as calculated from the batch, capable of being crystallized in situ to yield glass-ceramic articles, which compositions illustrate the composition parameters of the present invention. Inasmuch as the sum of the individual components closely approximates 100, for all practical purposes the values recorded may be deemed to represent weight percent.

The actual ingredients employed in preparing the glass forming batch may comprise any materials, either the oxides or other materials, which, when melted together will be converted into the desired oxide in the proper proportions. However, note that the redox condition may be changed or controlled by a change in the source material for a certain oxide. For example, the two lime (CaO) batch materials, aragonite and limestone, used in this study differ in their level of purity; the aragonite contains significant levels of organic oils and sulfur, not contained in the limestone, which are easily reduced during melting. Therefore, to melt under reducing conditions the batch material for the lime would be aragonite; under oxidizing or neutral conditions the batch material would be limestone. Also, the melting conditions may be varied through the addition of either a oxidizing or reducing agent.

For example, assuming oxidizing or mildly reducing melting conditions, the addition of a known reducing agent such as sugar or starch will change the conditions to that of reduction. The opposite effect, i.e., oxidizing conditions, will be achieved through the addition of a known oxidation agent such as $NaNO_3$. This change in redox condition has an effect on the final color achievable, regardless of the colorant system that is being utilized, as will be later discussed.

The appropriate batch ingredients were ball milled and melted in an electric furnace using covered 500 cc platinum or silica crucibles; silica crucibles only, for compositions containing cadmium sulfide or selenium. The glasses were melted at 1300°-1325° C. for 3-4 hours and during the melt the glasses were stirred to ensure homogeneity of color. A 3×3 in. (7.6×7.6 cm) patty was poured from each crucible onto a stainless steel plate and thereafter annealed at 475°-500° C. These patties were then cerammed according to the following schedule: (1) 300° C./hr to 870° C.; (2) 1-2 hour hold at 870° C.; and, (3) cool down at furnace rate. Minor variations in the heat treatment had no observable effect on the final color.

It will be appreciated that the above glass melting and forming processes reflect laboratory practice only. Stated in another way, the above glasses are capable of being melted and formed utilizing commercial, large scale glass melting and forming equipment, and are not limited to laboratory activity.

TABLE I

|  | 1 | 2 | 3 | 4 | 5 | 6 |
|---|---|---|---|---|---|---|
| $SiO_2$ | 57.0 | 57.0 | 57.0 | 57.0 | 57.0 | 57.0 |
| CaO | 20.3 | 20.3 | 20.3 | 20.3 | 20.3 | 20.3 |
| $Na_2O$ | 8.0 | 8.0 | 8.0 | 8.0 | 8.0 | 8.0 |
| $K_2O$ | 9.0 | 9.0 | 9.0 | 9.0 | 9.0 | 9.0 |
| F | 6.0 | 6.0 | 6.0 | 6.0 | 6.0 | 6.0 |
| $Al_2O_3$ | 2.0 | 2.0 | 2.0 | 2.0 | 2.0 | 2.0 |
| CdS | 0.2 | 0.2 | 1.0 | — | 0.5 | 1.0 |
| Se | 0.05 | 0.2 | 1.0 | 1.0 | 1.0 | 0.3 |
| CdO | — | — | — | 1.0 | — | — |
| Cerammed Color | Bright Orange | Brick Red | Bright Red | Chocol. Brown | Maroon | Bright Orange |

|  | 7 | 8 | 9 | 10 | 11 | 12 |
|---|---|---|---|---|---|---|
| $SiO_2$ | 57.0 | 57.0 | 57.0 | 57.0 | 57.0 | 57.0 |
| CaO | 20.3 | 20.3 | 20.3 | 20.3 | 20.3 | 20.3 |
| $Na_2O$ | 8.0 | 8.0 | 8.0 | 8.0 | 8.0 | 8.0 |
| $K_2O$ | 9.0 | 9.0 | 9.0 | 9.0 | 9.0 | 9.0 |
| F | 6.0 | 6.0 | 6.0 | 6.0 | 6.0 | 6.0 |
| $Al_2O_3$ | 2.0 | 2.0 | 2.0 | 2.0 | 2.0 | 2.0 |
| CdS | 0.2 | — | 0.075 | 0.25 | 0.5 | — |
| Se | 0.2 | 0.5 | 0.5 | 0.5 | 0.5 | 0.5 |
| CdO | — | — | — | — | — | — |
| Cerammed Color | Dark Peach, Reddish | Chocol. Brown | Chocol. Brown | Bright Maroon | Bright Red-Orange | Dark Chocol. Brown |

|  | 13 | 14 | 15 | 16 | 17 | 18 |
|---|---|---|---|---|---|---|
| $SiO_2$ | 57.0 | 57.0 | 57.0 | 57.0 | 57.0 | 57.4 |
| CaO | 20.3 | 20.3 | 20.3 | 20.3 | 20.3 | 20.2 |
| $Na_2O$ | 8.0 | 8.0 | 8.0 | 8.0 | 8.0 | 8.0 |
| $K_2O$ | 9.0 | 9.0 | 9.0 | 9.0 | 9.0 | 8.8 |
| F | 6.0 | 6.0 | 6.0 | 6.0 | 6.0 | 6.2 |
| $Al_2O_3$ | 2.0 | 2.0 | 2.0 | 2.0 | 2.0 | 2.0 |
| CdS | 0.75 | 0.20 | 0.25 | 1.0 | 0.50 | 0.35 |
| Se | 0.40 | 0.04 | 0.50 | — | 0.70 | 0.5 |
| CdO | — | — | — | — | — | — |
| Cerammed Color | Bright Orange | Paler Orange | Burgundy | Bright Yellow | Cherry Red | Red |

Table I reports the wide range of bright glass-ceramic colors that can be obtained using the CdS-Se-CdO colorant system, as a function of the colorant composition.

Samples 1–18, all melted under reducing conditions, i.e., a lime source of aragonite and the absence of any oxidizing agent, demonstrate the obtainable color range, yellow-to-red-to-orange-to-brown, that can be produced under these proper, mildly reducing conditions.

TABLE II

|  | 19 | 20 | 21 | 22 | 23 | 24 |
|---|---|---|---|---|---|---|
| $SiO_2$ | 57.4 | 57.4 | 57.4 | 57.4 | 57.4 | 57.4 |
| CaO | 20.2 | 20.2 | 20.2 | 20.2 | 20.2 | 20.2 |
| $Na_2O$ | 8.0 | 8.0 | 8.0 | 8.0 | 8.0 | 8.0 |
| $K_2O$ | 8.8 | 8.8 | 8.8 | 8.8 | 8.8 | 8.8 |
| F | 6.2 | 6.2 | 6.2 | 6.2 | 6.2 | 6.2 |
| $Al_2O_3$ | 2.0 | 2.0 | 2.0 | 2.0 | 2.0 | 2.0 |
| CdS | 0.35 | 0.35 | 0.35 | — | — | — |
| Se | 0.50 | 0.50 | 0.50 | 0.50 | 0.50 | 0.50 |
| CdO | — | — | — | 0.35 | 0.35 | 0.35 |
| A/L* | L | L | A | L | A | A |
| Y/N** | Y | N | N | N | N | Y |
| Cerammed Color | Light-Pink to Beige | Medium Brown | Medium Red | Medium to Dark Apricot | Dark Chocol. Brown | Medium to Pink Beige |

*A = aragonite  L = limestone
**Y = $NaNO_3$ added to batch materials  N = no $NaNO_3$ added Table II reports the "pronounced" effect that a change in the redox conditions, from mildly reducing to oxidation, has on the glass-ceramic. The redox change may be accomplished through the addition of oxidation agent $NaNO_3$ or through the addition of batch materials susceptible to reduction, such as a lime source of aragonite. As can be seen from Table II, the two samples 19 and 24, melted under undesirable oxidizing conditions produced through the addition of $NaNO_3$, exhibiting pale beige colors.

TABLE III

|  | 25 | 26 | 27 | 28 | 29 | 30 | 31 | 32 |
|---|---|---|---|---|---|---|---|---|
| $SiO_2$ | 57.0 | 57.0 | 57.0 | 57.0 | 57.0 | 57.0 | 57.0 | 57.0 |
| CaO | 20.3 | 20.3 | 20.3 | 20.3 | 20.3 | 20.3 | 20.3 | 20.3 |
| $Na_2O$ | 8.0 | 8.0 | 8.0 | 8.0 | 8.0 | 8.0 | 8.0 | 8.0 |
| $K_2O$ | 9.0 | 9.0 | 9.0 | 9.0 | 9.0 | 9.0 | 9.0 | 9.0 |
| F | 6.0 | 6.0 | 6.0 | 6.0 | 6.0 | 6.0 | 6.0 | 6.0 |
| $Al_2O_3$ | 2.0 | 2.0 | 2.0 | 2.0 | 2.0 | 2.0 | 2.0 | 2.0 |
| $Cr_2O_3$ | — | — | 0.05 | 0.03 | 0.05 | 0.025 | 0.012 | 0.04 |
| $Co_3O_4$ | 0.05 | 0.05 | 0.05 | 0.01 | 0.005 | 0.050 | 0.01 | — |
| NiO | — | — | — | — | — | — | 0.05 | — |
| $V_2O_5$ | — | — | — | — | — | — | — | 1.0 |
| A/L* | A | A | A | A | A | A | L | A |
| Y/N** | Y | N | Y | Y | N | Y | Y | N |
| Cerammed Color | Purplish Blue | Navy | Bright Teal | Medium Aqua | Olive Green | Warm Cobalt Blue | Dusty Blue | Jade Green |

*A = aragonite  L = limestone
**Y = $NaNO_3$ added to batch materials  N = no $NaNO_3$ added Table III reports the range of colors obtainable using the $Co_3O_4$-$Cr_2O_3$ colorant system. Also included therein is: (1) whether the oxidizing agent, $NaNO_3$, was added to the batch; and, (2) which source of the CaO, aragonite or limestone, was added as batch material.

Samples 25 and 26, same base and colorant composition, melted under oxidizing and reducing conditions, respectively, yielded purplish blue and navy colors, respectively. In other words, the effect of change in redox conditions is not as severe as in the CdS-Se-CdO system; only the tint/shade of the color is changed.

TABLE IV

|  | 33 | 34 | 35 | 36 | 37 | 38 | 39 | 40 |
|---|---|---|---|---|---|---|---|---|
| $SiO_2$ | 57.4 | 57.4 | 57.4 | 57.4 | 57.4 | 57.4 | 57.4 | 57.4 |
| CaO | 20.2 | 20.2 | 20.2 | 20.2 | 20.2 | 20.2 | 20.2 | 20.2 |
| $Na_2O$ | 8.0 | 8.0 | 8.0 | 8.0 | 8.0 | 8.0 | 8.0 | 8.0 |
| $K_2O$ | 8.8 | 8.8 | 8.8 | 8.8 | 8.8 | 8.8 | 8.8 | 8.8 |
| F | 6.2 | 6.2 | 6.2 | 6.2 | 6.2 | 6.2 | 6.2 | 6.2 |
| $Al_2O_3$ | 2.0 | 2.0 | 2.0 | 2.0 | 2.0 | 2.0 | 2.0 | 2.0 |
| NiO | 0.1 | 0.1 | 0.1 | 0.1 | 0.1 | 0.1 | 0.2 | 0.2 |
| Excess. Sulfide Batch Source | — | $Na_2S$ | $Na_2S$ | S | CdS | ZnS | — | — |
| (S) Level % | .005 | .015 | .028 | .050 | 0.084 | .164 | — | — |
| A/L* | L | L | L | L | L | L | A | A |
| Y/N** | Y | Y | Y | Y | N | N | Y | N |
| Cerammed Color | Medium Gray | Medium Gray | Medium to Dark Gray | Medium to Dark Gray | Dark Gray | Charcoal Black | Medium Gray | Black |

*A = aragonite  L = limestone
**Y = $NaNO_3$ added to batch materials  N = no $NaNO_3$ added In Table IV, samples 33–38 illustrate the general color trend as a result of increasing the impurity level in the batch source, when utilizing the NiO colorant system. These samples, with a CaO source of limestone and no NaNO₃, contain increasing amounts of the impurity S, i.e., there is an increase, from sample to sample, in the amount of reduction occurring during melting of the precursor glass. This increase is controlled through the addition, into the batch, of a material containing excess S.

For example, Sample 36 contains, as the source of sodium, that of sodium sulfide and as the Table shows the other samples contain similar additions. Sample 40, highest excess S/greatest reduction during melting, is formed under ideal conditions and thus a strong, bright black glass-ceramic is formed.

Samples 39 and 40 were added to Table IV to show the adverse result of producing the glass-ceramic under oxidizing conditions. Both samples contain the same percentage of the NiO colorant as well as identical sources of CaO, that of reduction susceptible aragonite. However, sample 41 contains the oxidizing agent NaNO₃, while sample 42 does not. Sample 42, formed under reducing conditions with a proper percentage of NiO colorant, results in a strong vivid black glass-ceramic.

TABLE V

|  | 27 | 41 | 42 | 43 | 44 | 45 | 21 | 46 | 47 |
|---|---|---|---|---|---|---|---|---|---|
| $SiO_2$ | 57.3 | 67.3 | 69.7 | 57.3 | 67.3 | 69.7 | 57.3 | 67.3 | 69.7 |
| CaO | 20.2 | 4.7 | — | 20.2 | 4.7 | — | 20.2 | 4.7 | — |
| $Na_2O$ | 8.0 | 3.0 | — | 8.0 | 3.0 | — | 8.0 | 3.0 | — |
| $K_2O$ | 8.8 | 4.8 | — | 8.8 | 4.8 | — | 8.8 | 4.8 | — |
| $Al_2O_3$ | 2.0 | 1.8 | 17.8 | 2.0 | 1.8 | 17.8 | 2.0 | 1.8 | 17.8 |
| F | 6.3 | 3.6 | — | 6.3 | 3.6 | — | 6.3 | 3.6 | — |
| MgO | — | 14.3 | 2.6 | — | 14.3 | 2.6 | — | 14.3 | 2.6 |
| $Li_2O$ | — | 0.8 | 2.8 | — | 0.8 | 2.8 | — | 0.8 | 2.8 |
| BaO | — | 0.25 | — | — | 0.25 | — | — | 0.25 | — |
| $P_2O_5$ | — | 1.0 | — | — | 1.0 | — | — | 1.0 | — |
| ZnO | — | — | 1.0 | — | — | 1.0 | — | — | 1.0 |
| $TiO_2$ | — | — | 4.7 | — | — | 4.7 | — | — | 4.7 |
| $As_2O_5$ | — | — | 1.0 | — | — | 1.0 | — | — | 1.0 |
| $Co_3O_4$ | 0.05 | 0.05 | 0.05 | — | — | — | — | — | — |
| $Cr_2O_3$ | 0.05 | 0.05 | 0.05 | 0.01 | 0.01 | 0.01 | — | — | — |
| NiO | — | — | — | 0.05 | 0.05 | 0.05 | — | — | — |
| CdS | — | — | — | — | — | — | 0.35 | 0.35 | 0.35 |
| Se | — | — | — | — | — | — | 0.50 | 0.50 | 0.50 |
| Cerammed Color | Bright Teal | Light Purple | Pale/Dusty Blue | Charcoal | White | White | Medium Red | Light Pink | White |

Table V illustrates the color advantage that the canasite glass-ceramics disclosed herein have over other different glass-ceramics utilizing the same colorant system. Samples 41, 44 and 46, K-richterite glass-ceramics, have as their precursor glass composition that disclosed in U.S. Pat. No. 4,608,348 (Beall et al.), while samples 42, 45 and 47, known and marketed as CORNING WARE ® by Corning Incorporated, Corning, N.Y. has as its precursor glass that disclosed in U.S. Pat. No. 3,157,522 (Stookey). These comparison glass-ceramics samples were all prepared according to the directions outlined in each of the respective patents.

In comparing samples 27, 41 and 42, all containing the 0.05% $Co_3O_4$ – 0.05% $Cr_2O_3$ colorant system, it can be seen that sample 29's canasite is the only one to exhibit a bright vivid color; teal vs. light purple-dusty blue. The same result is evident in the 0.35% CdS–0.50% Se (samples 21, 46 & 47) and 0.01% $Cr_2O_3$ – 0.05% NiO (samples 43, 44 & 45) colorant systems; medium red vs. light pink-white and charcoal vs. white-white, respectively.

I claim:

1. An opaque glass-ceramic article in a mildly reduced state exhibiting strong bright coloration ranging from yellow-to-orange-to-red-to-brown containing canasite crystals as the predominate crystal phase, said glass-ceramic article consisting essentially, expressed in the terms of weight percent on the oxide basis, of about 45–75% $SiO_2$, 8–30% CaO, 3.5–12% F, 3–15% $Na_2O$, 0–20% $K_2O$, 5–25% $Na_2O+K_2O$, 0–6% $B_2O_3$, 0–7% $Al_2O_3$, 0–12% $ZrO_2$, and 0.1–2.5% total of at least one member selected from the group consisting of CdS, Se and CdO, the maximum amount of any individual member being about 2.0%.

2. An opaque glass-ceramic article exhibiting strong bright coloration ranging from purple-to-blue-to-green containing canasite crystals as the predominate crystal phase, said glass-ceramic article consisting essentially, expressed in the terms of weight percent on the oxide basis, of about 45–75% $SiO_2$, 8–30% CaO, 3.5–12% F, 3–15% $Na_2O$, 0–20% $K_2O$, 5–25% $Na_2O+K_2O$, 0–6% $B_2O_3$, 0–7% $Al_2O_3$, 0–12% $ZrO_2$ and 0.02–1.5% total of at least one member selected from the group consisting of $Cr_2O_3$ and $Co_3O_4$, the maximum amount of any individual member being about 1.0%.

3. An opaque glass-ceramic article in a reduced state exhibiting a strong bright black coloration containing canasite crystals as the predominate crystal phase, said glass-ceramic consisting essentially, expressed in the terms of weight percent on the oxide basis, of about 45–75% $SiO_2$, 8–30% CaO, 3.5–12% F, 3–15% $Na_2O$, 0–20% $K_2O$, 5–25% $Na_2O+K_2O$, 0–6% $B_2O_3$, 0–7% $Al_2O_3$ 0–12% $ZrO_2$ and 0.01–1.0% total of NiO with optionally about 0.001–0.05% total of $Cr_2O_3$.

4. The opaque glass-ceramic article as claimed in claim 1 wherein said composition consists essentially of about 50–65% $SiO_2$, 15–24% CaO, 5–9% F, 3–13% $Na_2O$, 3–15% $K_2O$, 11–22% $Na_2O+K_2O$, 1–3% $B_2O_3$, 0–3% $Al_2O_3$ and 0–8% $ZrO_2$.

5. The opaque glass-ceramic article as claimed in claim 2 wherein said composition optionally contains about 0.01–1.5% total of an at least one member selected from the group consisting of NiO and $V_2O_5$.

6. The opaque glass-ceramic article as claimed in claim 2 wherein said composition consists essentially of about 50–65% $SiO_2$, 15–24% CaO, 5–9% F, 3–13% $Na_2O$, 3–15% $K_2O$, 11–22% $Na_2O+K_2O$, 1–3% $B_2O_3$, 0–3% $Al_2O_3$ and 0–8% $ZrO_2$.

7. The opaque glass-ceramic article as claimed in claim 3 wherein said composition consists essentially of about 50–65% $SiO_2$, 15–24% CaO, 5–9% F, 3–13% $Na_2O$, 3–15% $K_2O$, 11–22% $Na_2O+K_2O$, 1–3% $B_2O_3$, 0–3% $Al_2O_3$ and 0–8% $ZrO_2$.

* * * * *